United States Patent
Woo et al.

(10) Patent No.: US 9,998,506 B2
(45) Date of Patent: Jun. 12, 2018

(54) METHOD AND APPARATUS FOR TRANSMITTING GROUPCAST TO SUPPORT VOICE PAGING SERVICE IN VOICE OVER INTERNET PROTOCOL SYSTEM

(75) Inventors: Si-Nam Woo, Hwaseong-si (KR); Hyun-A Kim, Suwon-si (KR); Pyung-Bin Lim, Suwon-si (KR); Sang-II Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 504 days.

(21) Appl. No.: 12/652,182

(22) Filed: Jan. 5, 2010

(65) Prior Publication Data

US 2010/0172346 A1 Jul. 8, 2010

(30) Foreign Application Priority Data

Jan. 5, 2009 (KR) .................... 10-2009-0000304

(51) Int. Cl.
*H04L 12/66* (2006.01)
*H04L 29/06* (2006.01)
*H04L 12/18* (2006.01)

(52) U.S. Cl.
CPC .......... *H04L 65/40* (2013.01); *H04L 12/1836* (2013.01)

(58) Field of Classification Search
CPC . H04L 65/40; H04L 12/1836; H04L 12/2807; H04L 41/0803; H04L 45/02
USPC ....... 370/260, 264, 265, 271, 401, 402, 352, 370/395
See application file for complete search history.

(56) References Cited

U.S. PATENT DOCUMENTS

| | | | |
|---|---|---|---|
| 6,253,062 B1 * | 6/2001 | Leyendecker | 340/7.2 |
| 6,640,249 B1 * | 10/2003 | Bowman-Amuah | G06F 8/36 709/228 |
| 7,529,200 B2 * | 5/2009 | Schmidt et al. | 370/260 |
| 7,778,240 B1 * | 8/2010 | Kalmanek et al. | 370/352 |
| 7,852,831 B2 * | 12/2010 | Akbar | 370/352 |
| 7,941,551 B2 * | 5/2011 | Anantharaman et al. | 709/228 |
| 8,112,078 B2 * | 2/2012 | Calabrese | 455/426.1 |
| 8,160,054 B2 * | 4/2012 | Weiner | 370/351 |
| 8,279,845 B2 * | 10/2012 | Tan et al. | 370/342 |
| 2001/0018714 A1 * | 8/2001 | Yagyu et al. | 709/245 |
| 2002/0026489 A1 * | 2/2002 | Homma | 709/206 |
| 2003/0133458 A1 * | 7/2003 | Sato et al. | 370/395.6 |

(Continued)

FOREIGN PATENT DOCUMENTS

| | | |
|---|---|---|
| KR | 10-2005-0103587 A | 11/2005 |
| KR | 10-2007-0081724 A | 8/2007 |

(Continued)

*Primary Examiner* — Khaled Kassim
*Assistant Examiner* — Syed S Ali
(74) *Attorney, Agent, or Firm* — Jefferson IP Law, LLP

(57) ABSTRACT

A method and apparatus for transmitting a groupcast to support a voice paging service in a VoIP system are provided. In the method, a voice paging message is received from a voice paging transmitting terminal and one or more voice paging messages are reproduced from the received voice paging message. A group table is used to change the destination address and port of each of the reproduced voice paging messages into the IP address and port of each of one or more voice paging receiving terminals. Each of the reproduced voice paging messages is unicast on the basis of the changed IP address and port.

10 Claims, 7 Drawing Sheets

(56) References Cited

U.S. PATENT DOCUMENTS

| | | | | |
|---|---|---|---|---|
| 2004/0062264 A1* | 4/2004 | Adams | | H04L 51/36 370/432 |
| 2006/0072588 A1* | 4/2006 | Kim et al. | | 370/400 |
| 2006/0098577 A1* | 5/2006 | MeLampy | | H04L 29/06027 370/238 |
| 2006/0172750 A1* | 8/2006 | Mizoguchi | | 455/466 |
| 2006/0193319 A1* | 8/2006 | Sung | | H04L 29/06027 370/389 |
| 2006/0268738 A1* | 11/2006 | Goerke et al. | | 370/254 |
| 2006/0268750 A1* | 11/2006 | Weiner | | 370/260 |
| 2006/0290519 A1* | 12/2006 | Boate et al. | | 340/573.4 |
| 2007/0005808 A1* | 1/2007 | Day | | H04L 41/145 709/248 |
| 2007/0036151 A1* | 2/2007 | Baeder | | 370/352 |
| 2007/0189311 A1* | 8/2007 | Kim | | H04L 29/12009 370/401 |
| 2007/0274504 A1* | 11/2007 | Maes | | 379/265.01 |
| 2008/0123632 A1* | 5/2008 | Lee | | 370/352 |
| 2008/0151875 A1* | 6/2008 | Lim | | H04L 29/12377 370/352 |
| 2008/0186913 A1* | 8/2008 | Ahn | | H04L 12/185 370/329 |
| 2009/0017855 A1* | 1/2009 | Kwon | | H04W 76/023 455/509 |
| 2009/0233596 A1* | 9/2009 | Calabrese | | 455/426.1 |
| 2009/0245232 A1* | 10/2009 | Van Gundy | | 370/352 |
| 2009/0282123 A1* | 11/2009 | Fornari | | H04L 12/1836 709/207 |
| 2009/0286528 A1* | 11/2009 | Lie et al. | | 455/422.1 |
| 2010/0014451 A1* | 1/2010 | Fujino | | 370/315 |
| 2010/0034200 A1* | 2/2010 | MeLampy et al. | | 370/352 |
| 2010/0046401 A1* | 2/2010 | Wright et al. | | 370/260 |
| 2010/0142410 A1* | 6/2010 | Huynh Van | | H04L 12/4633 370/255 |
| 2010/0217837 A1* | 8/2010 | Ansari | | G06Q 30/04 709/218 |
| 2011/0002240 A1* | 1/2011 | Harel | | H04L 45/02 370/254 |
| 2012/0166755 A1* | 6/2012 | Kato | | H04Q 11/04 711/203 |
| 2012/0177195 A1* | 7/2012 | Elliott | | H04L 12/6418 379/240 |
| 2012/0230300 A1* | 9/2012 | Goerke | | H04B 7/18539 370/335 |
| 2015/0370604 A1* | 12/2015 | Miwa | | G06F 9/5083 718/104 |
| 2016/0204983 A1* | 7/2016 | Huynh Van | | H04L 12/4633 370/254 |
| 2017/0078732 A1* | 3/2017 | Ansari | | H04N 21/482 |

FOREIGN PATENT DOCUMENTS

| | | |
|---|---|---|
| KR | 10-2008-0058791 A | 6/2008 |
| KR | 10-2009-0132687 A | 12/2009 |

* cited by examiner

METHOD AND APPARATUS FOR TRANSMITTING GROUPCAST TO SUPPORT VOICE PAGING SERVICE IN VOICE OVER INTERNET PROTOCOL SYSTEM

PRIORITY

This application claims the benefit under 35 U.S.C. § 119(a) of a Korean patent application filed in the Korean Intellectual Property Office on Jan. 5, 2009 and assigned Serial No. 10-2009-0000304, the entire disclosure of which is hereby incorporated by reference.

BACKGROUND OF THE INVENTION

1. Field of the Invention

The present invention relates to a voice paging service. More particularly, the present invention relates to a method and apparatus for transmitting a groupcast to support a voice paging service in a Voice over Internet Protocol (VoIP) system.

2. Description of the Related Art

Recently, based on the increased popularity and development of the Internet, a conventional telephone has been merged with technology used to support the Internet. The merging of the conventional telephone with Internet technology has allowed for replacing general phones with Internet phones. Internet phones are classified into a PC-to-PC type and a PC-to-phone type. Hereinafter, a service provided by Internet phones will be referred to as a Voice over Internet Protocol (VoIP) service.

An exemplary scheme for a voice paging service in a VoIP system includes a multicast scheme and a unicast scheme based on Digital Signal Processing (DSP). A multicasting address is necessary for multicast communication, and an Internet Group Management Protocol (IGMP) may be used to configure a multicasting group to perform packet transmission. That is, a voice message is transmitted with a multicasting address, which is transmitted by a multicasting router to users belonging to a group. The DSP-based unicast scheme allocates a DSP channel to each group user and performs Time Division Multiplexing (TDM), thereby unicast-transmitting a voice message to each terminal.

The multicast scheme efficiently transmits data between several transmitters/receivers in an n to n communication environment. However, the multicast scheme has a limitation in that all the routers in the network must retain information dynamically in order to forward a multicasting packet and a VoIP Private Branch eXchange (PBX), a VoIP phone and all the routers in the network must support a multicast routing protocol. Also, the multicast scheme is unsuitable for a 1 to n small-scale communication environment such as voice paging of the VoIP PBX. Also, the multicast scheme may cause an overhead in the network due to multicasting. Also, it is difficult for the multicast scheme to provide a Network Address Translation (NAT) for a VoIP phone in an NAT environment and implement independent traffic management. The DSP-based unicast scheme may waste resources because it must allocate a DSP channel to a group user.

What is therefore required is a method and apparatus for transmitting a groupcast to support a voice paging service in a VoIP system.

SUMMARY OF THE INVENTION

An aspect of the present invention is to address at least the above-mentioned problems and/or disadvantages and to provide at least the advantages below. Accordingly, an aspect of the present invention is to provide a method and apparatus for transmitting a groupcast to support a voice paging service in a VoIP system.

Another aspect of the present invention is to provide a method and apparatus for providing an independent Quality of Service (QoS) and traffic management function and a Network Address Translation (NAT) traversal function for a Voice over Internet Protocol (VoIP) phone in an NAT environment, with compatibility with a call processing operation, during a voice paging service.

In accordance with an aspect of the present invention, a method for transmitting a groupcast to support a voice paging service in a VoIP system is provided. The method includes receiving a voice paging message from a voice paging transmitting terminal and reproducing one or more voice paging messages from the received voice paging message, changing the destination address and port of each of the reproduced voice paging messages into the IP address and port of each of one or more voice paging receiving terminals using a group table, and unicasting each of the reproduced voice paging messages on the basis of the changed IP address and port.

In accordance with another aspect of the present invention, an apparatus for transmitting a groupcast to support a voice paging service in a VoIP system is provided. The apparatus includes a source terminal requesting a voice paging service to transmit a voice paging message to one or more destination terminals, a VoIP exchanger receiving a voice paging message from the source terminal to reproduce one or more voice paging messages from the received voice paging message, using a group table to change the destination address and port of each of the reproduced voice paging messages into the IP address and port of each of the destination terminals, and unicasting each of the reproduced voice paging messages on the basis of the IP address and port, and the destination terminals receiving the reproduced voice paging messages.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments the present invention will become more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and apparatus for transmitting a groupcast to support a voice paging service in a VoIP system.

Figure 1:
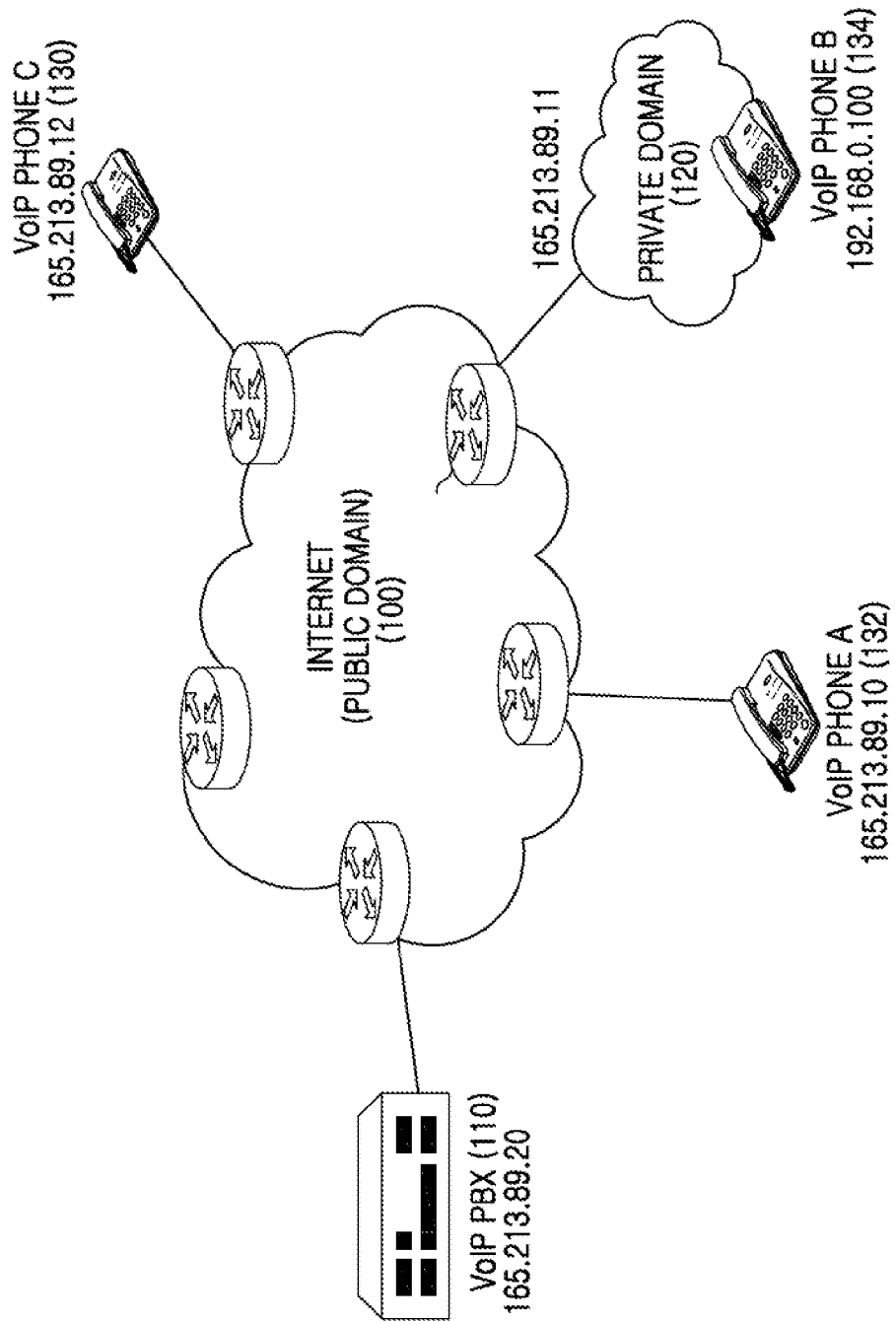
FIG. 1 is a diagram illustrating an example of the configuration of a VoIP network according to an exemplary embodiment of the present invention.

FIG. 1 is a diagram illustrating a configuration of a Voice over Internet Protocol (VoIP) network according to an exemplary embodiment of the present invention.

Referring to FIG. 1, a VoIP Private Branch eXchange (PBX) 110, a VoIP phone A 132 and a VoIP phone C 130 are located in a public domain 100, and a VoIP phone B 134 is connected to a private domain 120. Also, it is assumed that the VoIP phones A, B, C 132, 134, 130, respectively, are registered as a voice paging service group in the VoIP PBX 110.

The VoIP phones A, B, C 132, 134, 130, respectively, are Internet phones that convert voice signals into packet data, transmits the packet data through the Internet 100 to an opposite party, and converts the received voice data of the opposite party into analog voice signals prior to output. The VoIP phones A, B, C 132, 134, 130, respectively, may be a dedicated Internet phone or may be configured by installing an Internet phone application in a computer equipped with a sound card and a modem and connecting a headset thereto.

The public domain 100 uses public IP addresses, which are unique IP addresses in the Internet. The VoIP PBX 110 uses a public IP address 165.213.89.20, the VoIP phone A 132 uses a public IP address 165.213.89.10, and the VoIP phone C 130 uses a public IP address 165.213.89.12. The public domain 100 includes a plurality of routers that connect a Local Area Network (LAN). The router sets a path according to a routing table to transmit a packet.

The private domain 120 uses a private IP address, which cannot be identified in the Internet and is usable only in an internal network. For efficient use of limited IP addresses, the private domain 120 uses a sharer that is used in homes or companies. In this case, the VoIP phone B 134, connected through the sharer to the public domain 100, uses a private IP address. For example, the VoIP phone B 134 uses a private IP address 192.168.0.100.

When the VoIP phone B 134 transmits a media packet (e.g., audio and video) to the VoIP phone C 130 or the VoIP phone A 132, it is converted into a public IP address (e.g., 192.168.89.11) through Network Address Translation (NAT) prior to transmission. Thus, more internal IP addresses than prescribed are usable because they do not collide with other external IP addresses.

The VoIP PBX 110 includes a signaling processor and a media processor. The signaling processor performs a call connection/release operation. The media processor uses an IP forwarding scheme to provide a voice paging service and an NAT traversal function to a processor for a media stream.

Also, the VoIP PBX 110 performs a voice message transmission operation and a group setup/release operation for a voice paging service. The group setup/release operation includes an operation of setting the address of a sender of a voice message and address information of a group user. Registered information is used to transmit a voice message to a group user, Quality of Service (QoS) is supportable for each terminal, and admission control is provided through a packet filter of received information. Also, it includes a group release operation after completion of a voice paging service.

The voice message transmission operation includes an operation of transmitting a received voice message to a group terminal on the basis of received information (e.g., a group table), an operation of providing an NAT traversal function for a VoIP in an NAT environment, and a call processing operation in the event of an incoming call during a paging service.

The VoIP network configuration of FIG. 1 will be exemplified in the following description.

Figure 2:
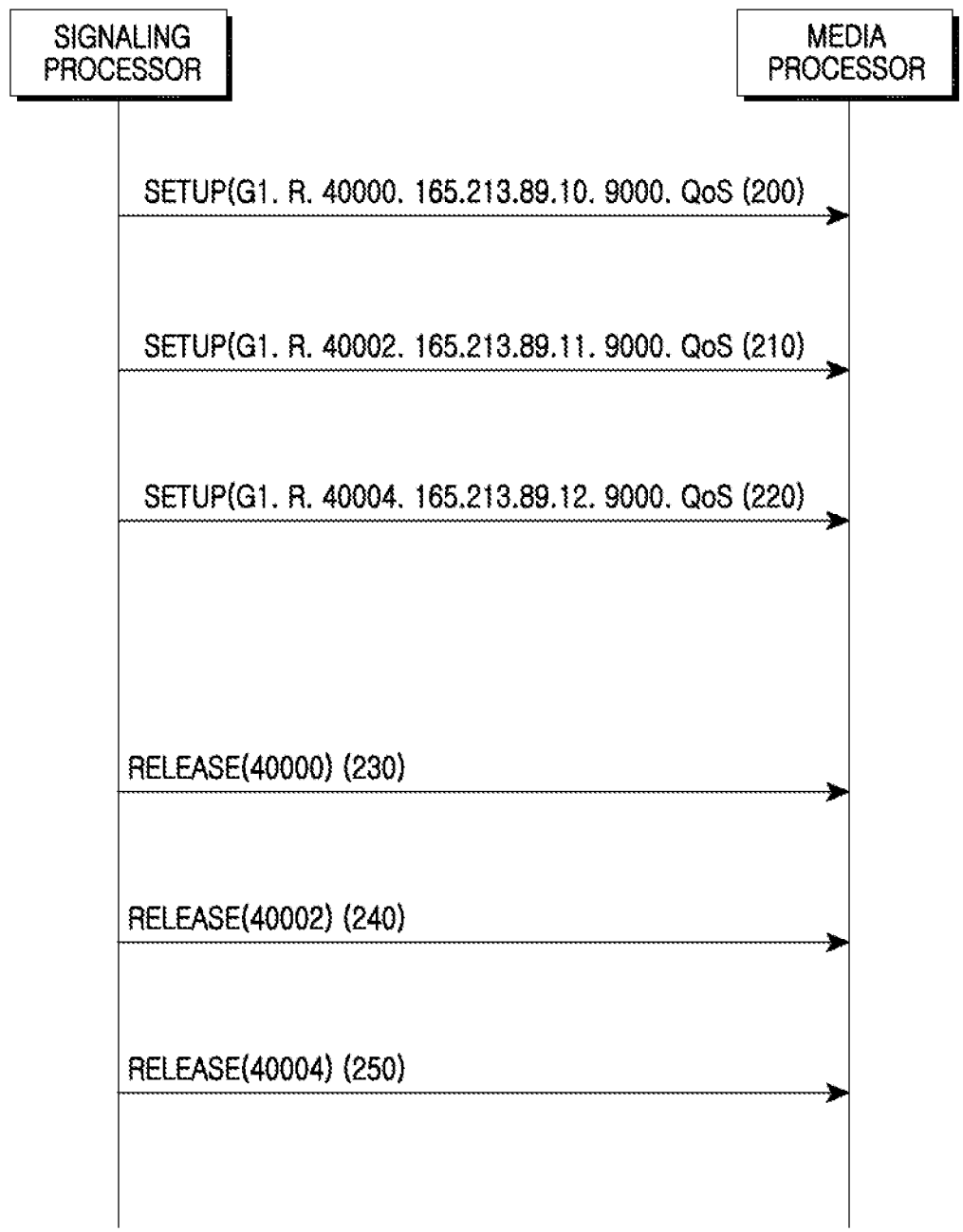
FIG. 2 is a flow diagram illustrating a process for requesting a voice paging service to a media processor of a Voice over Internet Protocol (VoIP) Private Branch eXchange (PBX) according to an exemplary embodiment of the present invention.

FIG. 2 is a flow diagram illustrating a process for requesting a voice paging service to the media processor of the VoIP PBX 110 according to an exemplary embodiment of the present invention.

Referring to FIG. 2, upon receiving a voice paging service request from an Internet phone, the signaling processor of the VoIP PBX 110 transmits a setup message to the media processor. The setup message includes a group number, information indicating whether it is a paging terminal or a user terminal, Real-time Transport Protocol (RTP) port information of the media processor, or address/port/QoS information of a paging terminal or a user terminal.

For example, in FIG. 1, when the VoIP phone A 132 (hereinafter referred to as voice paging terminal) is to transmit a voice message to the VoIP phone C 130 and the VoIP phone B 134, the signaling processor transmits a first setup message 200, a second setup message 210 and a third setup message 220 to the media processor. The first setup message includes the address, port (e.g., 165.213.89.10: 9000) and QoS values of the VoIP phone A 132 (which is a voice paging terminal), the corresponding RTP port (40000), information (R) indicating that it is a voice paging terminal, and group number (G1) information. The second setup message includes the address, port (e.g., 165.213.89.11: 9000) and QoS values of the VoIP phone B 134 (which is a user terminal), the corresponding RTP port (40002), information (T) indicating that it is a user terminal, and group number (G1) information. Likewise, the third setup message includes the address, port (e.g., 165.213.89.12: 9000) and QoS values of the VoIP phone C 130 (which is a user terminal), the corresponding RTP port (40004), information (T) indicating that it is a user terminal, and group number (G1) information.

Thereafter, in order to terminate a media session, the signaling processor transmits release messages 230, 240 and 250 including RTP port information of the media processor to the media processor. Through this process, a group table is configured as illustrated in FIG. 7.

Figure 3:
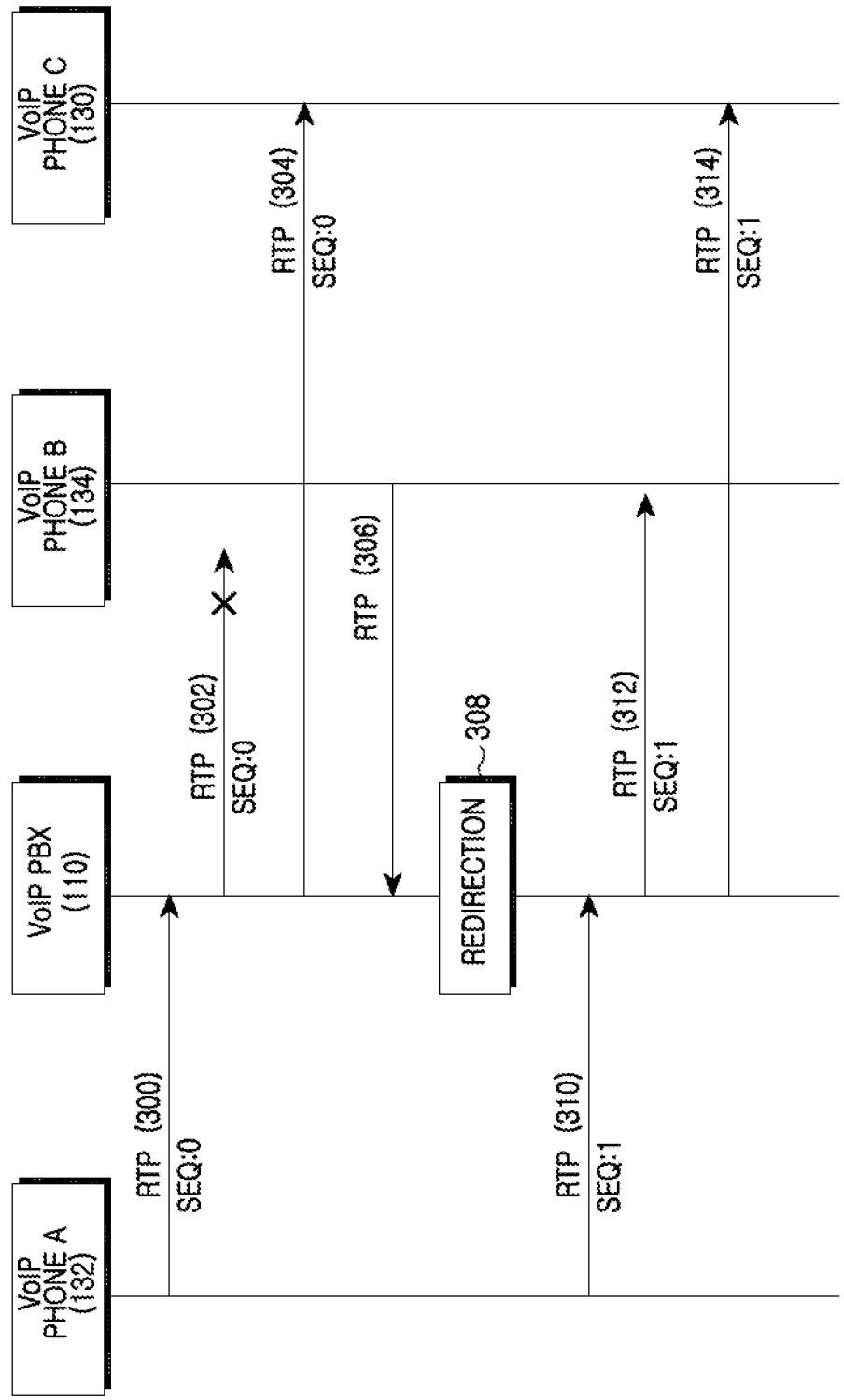
FIG. 3 is a flow diagram illustrating a process for transmitting a voice message generated by the media processor after paging service setup according to an exemplary embodiment of the present invention.

FIG. 3 is a flow diagram illustrating a process for transmitting a voice message generated by the media processor after paging service setup according to an exemplary embodiment of the present invention.

Figure 7:
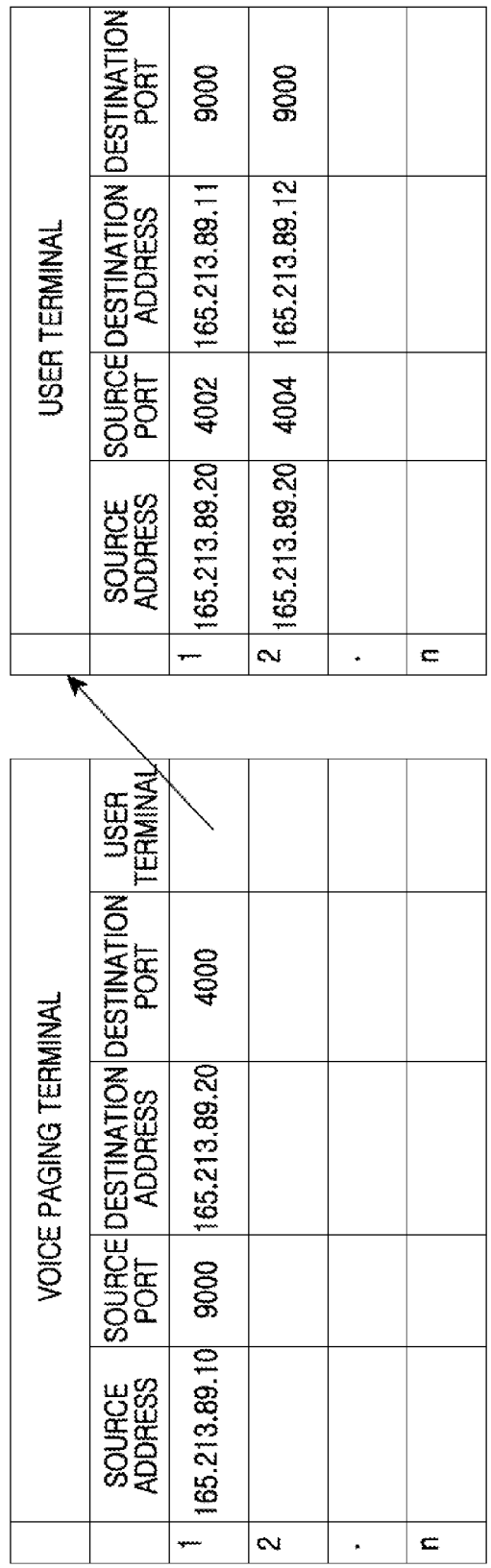
FIG. 7 is a diagram illustrating a group table managed by the media processor to process a voice paging service according to an exemplary embodiment of the present invention.

Referring to FIG. 3, when the VoIP phone A 132, which is a voice page terminal, transmits a voice message in step 300, the VoIP PBX 110 receives the voice message and transmits the same to the user terminal, the VoIP phone B 134, and the VoIP phone C 130 with reference to the group table of FIG. 7 in steps 302, and 304. The transmission is performed by changing into the address/port of the user terminal. For example, in the transmission to the VoIP phone C 130, the source address/port is changed into 165.213.89.20: 40002 and the destination address is changed into 165.213.89.11. In the transmission to the VoIP phone B 134, the source address/port is changed into 165.213.89.20: 40004 and the destination address is changed into 165.213.89.12.

At this point, the VoIP phone B 134 in an NAT environment fails in media transmission in step 302. The VoIP PBX 110 performs port redirection with a packet received from the VoIP phone B 134 in step 306. Thereafter, a voice message can be transmitted correctly in steps 310, 312, and 314. The port redirection in step 308 will be described later in more detail with reference to FIG. 5.

Figure 4:
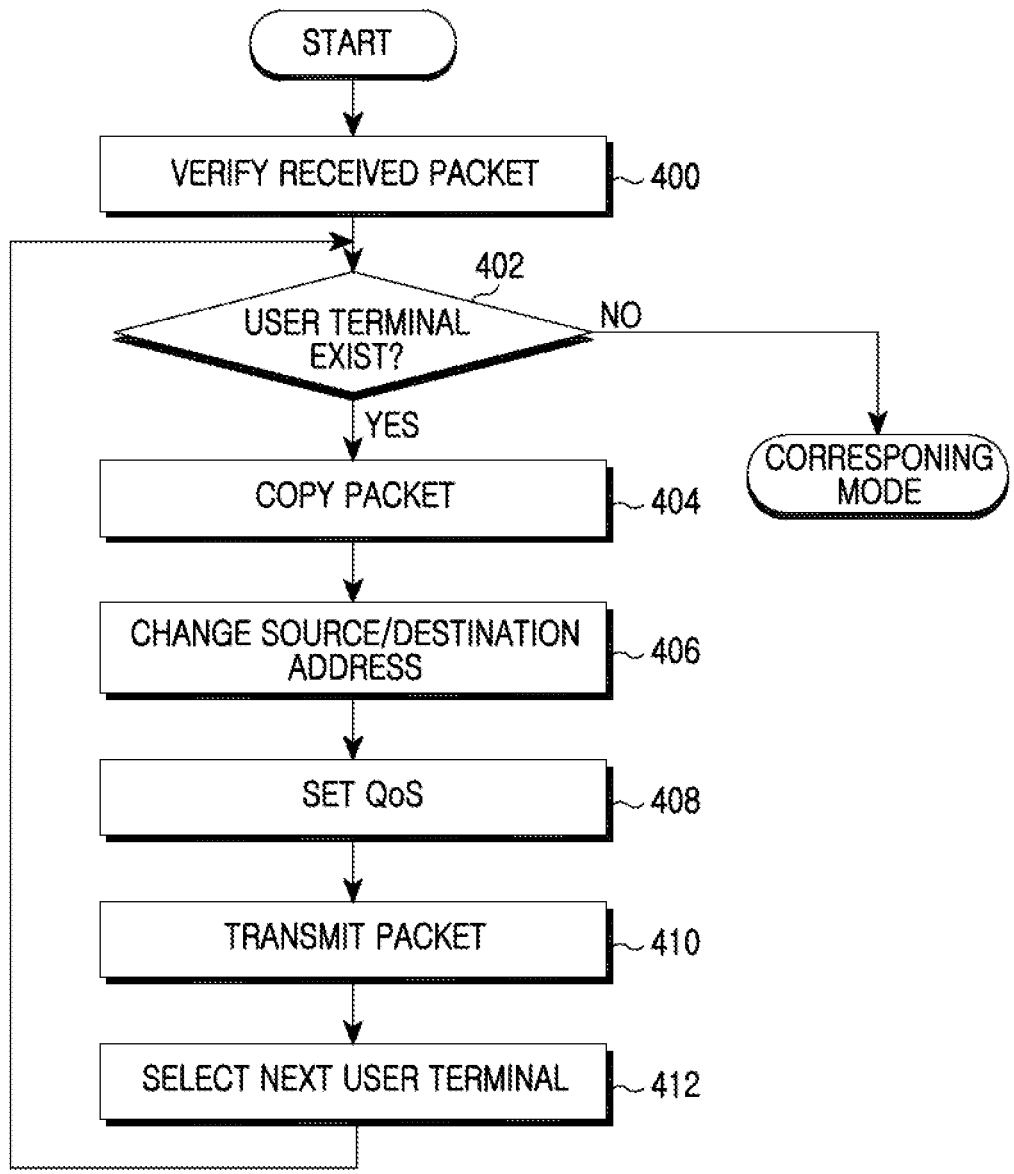
FIG. 4 is a flowchart illustrating a process for groupcast-transmitting a voice message using group table information according to an exemplary embodiment of the present invention.

FIG. 4 is a flowchart illustrating a process for groupcast-transmitting a voice message using group table information according to an exemplary embodiment of the present invention.

Referring to FIG. 4, the VoIP PBX 110 receives a voice paging message and determines the usefulness for a packet, in step 400. This is an admission control operation that filtering a received packet with the destination address/port and the source address.

In step 402, the VoIP PBX 110 determines, with reference to the group table, whether there is a user terminal. If it is determined in step 402 that there is no user terminal, another corresponding mode is performed.

If it is determined in step 402 that there is a user terminal, a received packet is copied to transmit a voice message to a group user in step 404. The source/destination address/port is changed on the basis of information of the user terminal of the group table in step 406.

If the QoS is set in step 408, the VoIP PBX 110 adds Type of Service (ToS)/Differentiated Service Code Point (DSCP) and transmits a packet to the corresponding user terminal in step 410.

In step 412, the VoIP PBX 110 selects the next user terminal with reference to the group table to perform steps 402 to 410. That is, a voice message is unicast-transmitted to each of user terminals registered in the group table.

Thereafter, the process of the present invention is ended.

Figure 5:
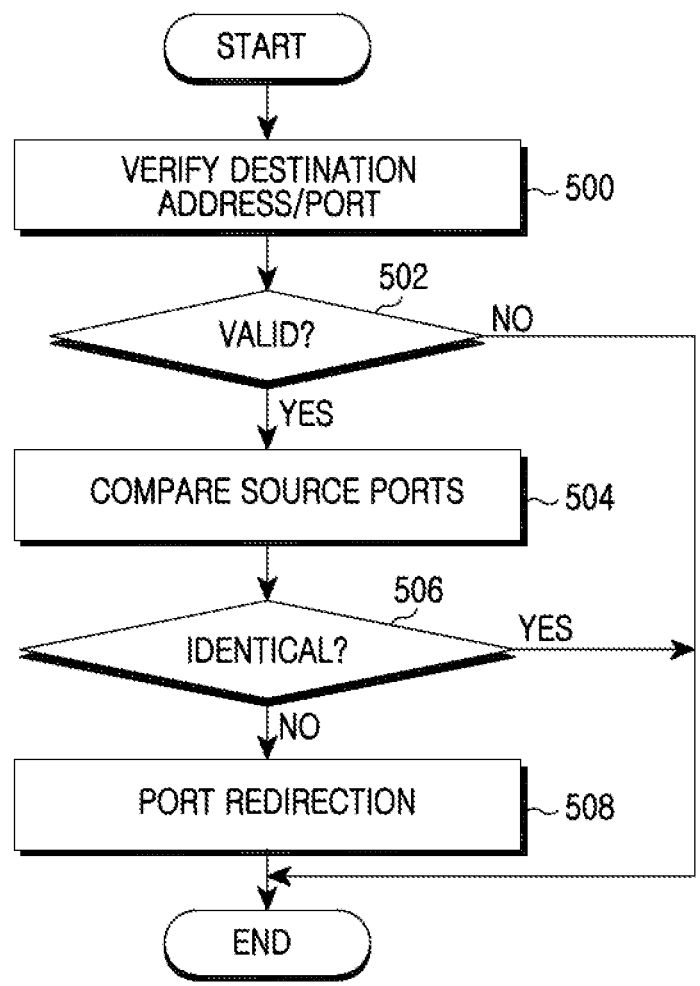
FIG. 5 is a flowchart illustrating a process for NAT traversal processing through port redirection for a VoIP phone in a Network Address Translation (NAT) environment according to an exemplary embodiment of the present invention.

FIG. 5 is a flowchart illustrating a process for NAT traversal processing through port redirection for a VoIP phone in an NAT environment according to an exemplary embodiment of the present invention.

Referring to FIG. 5, the VoIP PBX 110 verifies the destination address/port of a received packet in step 500. If it is determined in step 502 that the destination address/port is valid, the VoIP PBX 110 compares the source ports in step 504. If it is determined that they are not identical in step 506, the VoIP PBX 110 proceeds to step 508. The VoIP PBX 110 determines the existence of a NAT for a VoIP phone and changes the group table by the received source port (hereinafter referred to as port redirection) in step 508. The subsequently generated voice message transmits a packet to the changed RTP port. For example, if the VoIP PBX 110 sets a '9000' port for the VoIP phone B 134 connected to the private domain 120 and then the VoIP phone B 134 uses a '1024' port to transmit a packet to the VoIP PBX 110, the port number changes from '9000' to '1024'.

Thereafter, the process ends.

Figure 6:
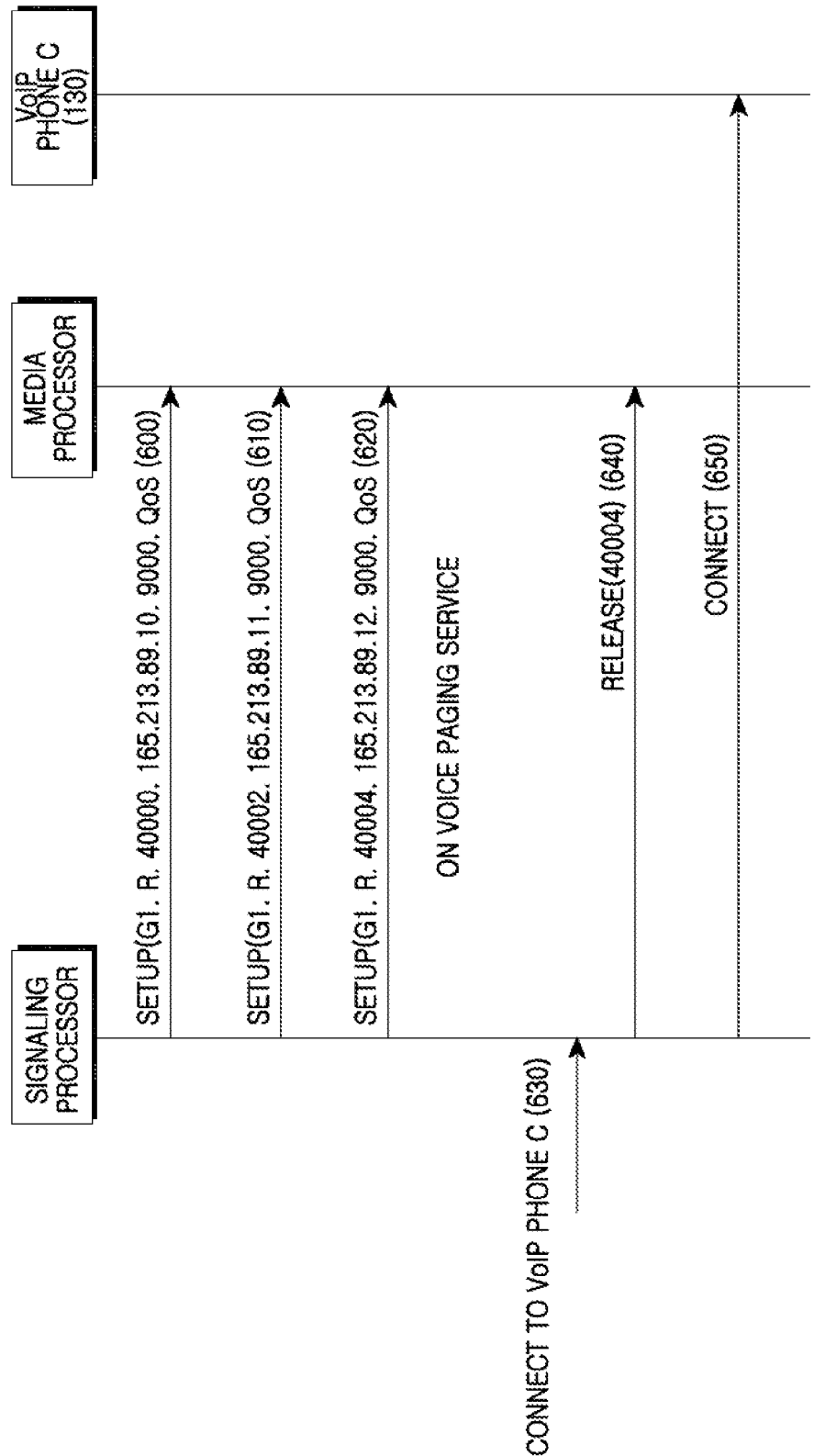
FIG. 6 is a flowchart illustrating a process for connecting a call in the event of call incoming to a user VoIP phone during a voice paging service according to an exemplary embodiment of the present invention.

FIG. 6 is a flowchart illustrating a process for connecting a call in the event of an incoming call to the VoIP phone 130 during a voice paging service according to an exemplary embodiment of the present invention.

Referring to FIG. 6, after a group table is configured in steps 600 to 620 in substantially the same way as in FIG. 2, if a call is received by the VoIP phone C 130 in step 630, a release message for an RTP port number '40004' is transmitted to the media processor in step 640 and a connection message is transmitted to the VoIP phone C 130 in step 650, thereby making it possible to provide an independent control regardless of the voice paging service and state and perform a call processing operation.

FIG. 7 is a diagram illustrating a group table managed by the media processor to process a voice paging service according to an exemplary embodiment of the present invention.

Referring to FIG. 7, the group table includes address/port information of a paging terminal, which is transmitting a voice message, address/port information of a user terminal, which is receiving a voice message, included in the group, and allocated RTP information of the media processor. The use of this information makes it possible to provide a message transmission function and an NAT traversal function and perform a filtering function for a received packet.

As described above, the group table is used to perform a groupcast operation, thereby making it possible to provide a voice paging service suitable for a VoIP PBX system, maximize the resource use efficiency and reduce an overhead due to multicasting in a network environment. Also, it is possible to provide an independent QoS and traffic management function and an NAT traversal function for a VoIP phone in an NAT environment, with compatibility with a call processing operation. Also, it is possible to reduce a waste of resources due to DSP channel allocation.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for an electronic device to operate in a voice over internet protocol (VoIP) system, the method comprising:
    configuring a group table for a service group based on a plurality of setup messages for a plurality of terminals comprising a transmitting terminal and a plurality of receiving terminals, each of the plurality of setup messages comprising an internet protocol (IP) address and port, a real-time transport protocol (RTP) port, and a quality of service (QoS) for each of the plurality of terminals;
    receiving a voice paging message from the transmitting terminal;
    determining, upon determining that a source IP address and port of the received voice paging message are identical to an IP address and port of the transmitting terminal included in the group table, whether an IP address and port of each of the plurality of receiving terminals are included in the group table;
    generating, upon determining that the IP address and port of each of the plurality of receiving terminals are included in the group table, a plurality of voice paging messages for the plurality of receiving terminals by copying the received voice paging message, wherein the number of the plurality of voice paging messages is equal to a number of the plurality of receiving terminals;
    changing a destination IP address and port of each of the plurality of generated voice paging messages into the IP address and port of each of the plurality of receiving terminals included in the group table; and
    unicasting each of the plurality of voice paging messages to each of the plurality of the receiving terminals, respectively, according to the changed destination IP address and port,
    wherein the transmitting terminal and the plurality of receiving terminals are registered, in the group table, as the service group, and
    wherein a QoS for each of the plurality of receiving terminals is set to each of the plurality of voice paging messages, respectively.

2. The method of claim 1, further comprising:
    receiving, from a receiving terminal among the plurality of receiving terminals, a packet;
    in response to determining that a source port of the received packet is not identical to a source port of the receiving terminal included in the group table, changing the group table, based on the source port of the received packet; and
    transmitting, to the receiving terminal, the voice paging message for the receiving terminal according to the source port of the received packet in the group table.

3. The method of claim 2, wherein changing the group table comprises:
    changing the source port of the receiving terminal included in the group table to the source port of the received packet.

4. The method of claim 1,
    wherein the configuring of the group table comprises:
        receiving a setup message from the transmitting terminal,
        transmitting a setup request message to each of the plurality of receiving terminals, and
        receiving a response message from the each of the plurality of receiving terminals, and
    wherein the response message comprises information for determining the RTP port and the IP address and port of the each of the plurality of receiving terminals.

5. The method of claim 1,
    wherein each of the plurality of setup messages further comprises a group number for indicating the service group the transmitting terminal and the plurality of receiving terminals corresponding to the transmitting terminal.

6. An apparatus to support a voice paging service in a voice over internet protocol (VoIP) system, the apparatus comprising:
    a memory configured to store instructions therein;
    a transceiver; and
    at least one processor operatively coupled to the transceiver,
    wherein, upon execution of the instructions, the at least one processor is configured to:
        configure a group table for a service group based on a plurality of setup messages for a plurality of terminals comprising a transmitting terminal and a plurality of receiving terminals, each of the plurality of setup messages comprising an internet protocol (IP) address and port, a real-time transport protocol (RTP) port, and a quality of service (QoS) for each of the plurality of terminals,
        receive a voice paging message from the transmitting terminal,
        determine, upon determining that a source IP address and port of the received voice paging message are identical to an IP address and port of the transmitting terminal included in the group table, whether an IP address and port of each of the plurality of receiving terminals are included in the group table,
        generate, upon determining that the IP address and port of each of the plurality of receiving terminals are included in the group table, a plurality of voice paging messages for the plurality of receiving terminals by coping the received voice paging message, wherein the number of the plurality of voice paging messages is equal to a number of the plurality of receiving terminals,
        change a destination IP address and port of each of the plurality of generated voice paging messages into the IP address and port of each of the plurality of receiving terminals included in the group table; and unicast each of the plurality of voice paging messages to each of the plurality of receiving terminals, respectively, according to the changed destination IP address and port, wherein the transmitting terminal and the plurality of receiving terminals are registered, in the group table, as the service group, and wherein a QoS for each of the plurality of receiving terminals is set to each of the plurality of voice paging messages, respectively.

7. The apparatus of claim 6, wherein the at least one processor is further configured to:

receive, from a receiving terminal among the plurality of receiving terminals, a packet;

in response to determining that a source port of the received packet is not identical to a source port of the receiving terminal included in the group table, change the group table, based on the source port of the received packet; and transmit, to the receiving terminal, the voice paging message for the receiving terminal according to the source port of the received packet in the group table.

8. The apparatus of claim 7, wherein the at least one processor is, in order to change the group table, configured to:

change the source port of the receiving terminal included in the group table to the source port of the received packet.

9. The apparatus of claim 6, wherein, the at least one processor is, in order to configure the group table, further configured to:

receive a setup message from the transmitting terminal, transmit a setup request message to each of the plurality of receiving terminals, and receive a response message from each of the plurality of receiving terminals, and wherein the response message comprises information for determining the RTP port and the IP address and port of the each of the plurality of receiving terminals.

10. The apparatus of claim 6, wherein each of the plurality of setup messages further comprises a group number for indicating the service group the transmitting terminal and the plurality of receiving terminals corresponding to the transmitting terminal.

* * * * *